United States Patent [19]

Eden

[11] Patent Number: 4,515,471

[45] Date of Patent: May 7, 1985

[54] SCANNING LASER RADAR

[75] Inventor: Dayton D. Eden, Dallas, Tex.

[73] Assignee: LTV Aerospace and Defense Company, Dallas, Tex.

[21] Appl. No.: 296,074

[22] Filed: Aug. 25, 1981

[51] Int. Cl.³ .......................... G01C 3/08; G01J 1/20; G01J 1/00; G02F 1/29

[52] U.S. Cl. .................... 356/5; 250/203 R; 250/342; 250/347; 250/203 CT; 350/359; 350/363; 356/152

[58] Field of Search .................... 455/609; 250/203 R, 250/203 CT, 342, 347; 356/5, 152; 350/359, 363

[56] References Cited

U.S. PATENT DOCUMENTS

| | | |
|---|---|---|
| 3,154,748 | 10/1964 | Javan et al. |
| 3,403,257 | 9/1968 | Petroff |
| 3,423,696 | 1/1969 | Chernoch |
| 3,492,596 | 1/1970 | Vorie |
| 3,504,182 | 3/1970 | Pizzurro et al. |
| 3,509,347 | 4/1970 | Lang et al. |
| 3,530,401 | 9/1970 | Garbuny et al. |
| 3,569,996 | 3/1971 | Goell et al. |
| 3,626,312 | 12/1971 | Snitzer |
| 3,626,317 | 12/1971 | Dakss et al. |
| 3,694,656 | 9/1972 | Henning |
| 3,731,991 | 5/1973 | Arnold |
| 3,764,213 | 10/1973 | O'Meara |
| 3,828,185 | 8/1974 | Vandling |
| 3,904,981 | 9/1975 | Hughes et al. |
| 3,968,362 | 7/1976 | Mocker |
| 3,970,839 | 7/1976 | Javan |

(List continued on next page.)

OTHER PUBLICATIONS

"Sealed Helium–Neon Laser", H. E. Klauser, IBM Technical Disclosure Bulletin, vol. 16, No. 6, 1973.
The Radar Handbook, M. Skolnik, McGraw-Hill, (1970).

Primary Examiner—S. C. Buczinski
Attorney, Agent, or Firm—Stephen S. Sadacca; James M. Cate

[57] ABSTRACT

In an optical radar system a coherent signal is transmitted at a variable position and the return signal, that is, the reflected portion of the coherent signal is received and coherently detected. The transmitter utilizes a scanning laser having an electron beam that impinges upon a variable reflectance mirror that terminates one end of an optical cavity. An oscillating mode is generated within the resonant cavity when the electron beam locally heats the surface of the variable reflectance mirror to create a pixel that reflects light in a diffracted pattern. The receiver utilizes a stable single mode laser to illuminate a variable reflectance surface. A receiver electron beam generates a plurality of receiver pixels at various positions. The diffracted light from each pixel generates a plurality of variable angle local oscillator beams that are summed with the return signal at a beamsplitter. The output of the beamsplitter is applied to the surface of a detector array. One of the local oscillator beams is positioned such that the return signal and the local oscillator beam overlap at one of the detectors in the array to provide coherent detection. The frequency of the first coherent signal and the second coherent signal are sampled by a first and second partially reflecting mirror. A frequency detector detects the output of the first and second partially reflecting mirror to detect the frequency difference between the first and second coherent signal and generate a control signal that adjusts the frequency of the first coherent signal. For heterodyne operation a selected frequency difference is generated whereas for homodyne detection a zero frequency difference is generated. An electronic computer coordinates the position of the scanning laser of the transmitter and the position of the local oscillator beams of the receiver such that one of the local oscillator beams will overlap with each of the corresponding return signals at the detector array. A second electronic computer processes the output of the detector array to provide information about the return signal.

3 Claims, 8 Drawing Figures

U.S. PATENT DOCUMENTS

| | | |
|---|---|---|
| 3,992,681 | 11/1976 | Haun et al. . |
| 4,005,935 | 2/1977 | Wang . |
| 4,025,783 | 5/1977 | Fletcher et al. . |
| 4,039,962 | 8/1977 | Hughes . |
| 4,042,822 | 8/1977 | Brandewie et al. . |
| 4,069,458 | 1/1978 | Farcy et al. . |
| 4,099,141 | 7/1978 | Leblanc et al. . |
| 4,148,584 | 4/1979 | Roelants . |
| 4,150,342 | 4/1979 | Johnston, Jr. et al. . |
| 4,158,176 | 6/1979 | Hunt et al. . |
| 4,168,473 | 9/1979 | Black, Jr. . |
| 4,174,524 | 11/1979 | Moran . |
| 4,176,327 | 11/1979 | Wayne et al. . |
| 4,193,088 | 3/1980 | Moran . |
| 4,194,813 | 3/1980 | Benjamin et al. . |
| 4,195,221 | 3/1980 | Moran . |
| 4,200,819 | 4/1980 | Haslund . |
| 4,201,910 | 5/1980 | Copeland et al. . |
| 4,219,786 | 8/1980 | Chester . |
| 4,279,036 | 7/1981 | Pfund .......... 250/203 R |
| 4,311,384 | 1/1982 | Keene .......... 356/152 |
| 4,311,385 | 1/1982 | Keene .......... 356/152 |
| 4,326,799 | 4/1982 | Keene et al. .......... 356/152 |

SCANNING LASER RADAR

TECHNICAL FIELD

The present invention pertains generally to optical radars and in particular to a scanning laser radar with an agile receiver.

BACKGROUND OF THE INVENTION

Laser radars inherently offer higher resolution than microwave radars, and most applications for these optical wavelength radars stem from this advantage. Laser radars offer fundamental advantage over other light sources in that they have a high degree of coherence—both spatial and temporal. The spatial coherence of the output radiation of a laser is determined by the type of oscillating mode supported in the laser cavity. Where only axial modes exist, and the end walls of the optical cavity are plain circular mirrors, the resulting radiation is emitted in a circular Fraunhofer diffraction pattern (known optically as an AIRY pattern). The angle between the central maximum (bright spot) and the first null (dark ring) is normally quite small.

In the microwave region (except for deliberate noise sources) radar transmitters have excellent time coherence (at least over short times). Unlike laser sources, very few multimode effects are significant in the microwave region, since most resonators are of the order of a wavelength in size. Spatial coherence is also much closer to the diffraction limit in microwave radiators than in corresponding optical radiators, again principally from dimensional considerations.

Lasers radars can be operated with either an envelope or a coherent detection system. Envelope detection is incoherent in that it does not preserve carrier-phase information in the detected signal but it is generally simpler and puts less constraints on laser coherence than coherent or heterodyne detectors. Unlike microwave video detectors, laser envelope detectors can for a short-pulse modulation and low background noise operate as quantum-limited devices and give essentially the same detectivity as coherent detectors.

Coherent detection in a laser radar requires good spatial coherence over the receiver aperture and a stable reference signal (generally offset in frequency from the transmitted signal) with which to mix the signal received from the target. Where all restraints can be met, coherent detection not only gives Doppler information on the target but also offers a means for obtaining quantum-limited detection in the face of relatively high background noise. This method of obtaining near-ideal detectivity is applicable as far into the infrared (IR) region as one can make an optical mixer. Unfortunately because of the spatial-coherence requirement, coherent detection severely limits the maximum size of the system aperture (optical antenna) and also the field of view (FOV).

Obviously, laser radars operate at a disadvantage, compared with microwave radars, in search functions. In the past, many laser radar applications required only a minimum of search. In many cases searches could be performed by supplementary sensors, such as microwave radars or passive optical or IR detection. A classic and very effective example of an optical search supplement is the use of a simple laser range finder, where the observer merely looks for a target before firing a laser.

When working against an extended target, laser radars, being exceedingly narrow beam systems, require some form of controlled beam steering or scanning. Laser trackers, like microwave trackers, require precisely controllable beam steering over small angular regions. Lasers that are required to perform independent search functions must scan the narrow laser beam over a wide region, generally very rapidly. Both mechanical and electrical beam-steering and scanning techniques are utilized as well as hybrids of the two. Because of the relatively small diameters (one centimeter) of laser beams, for many applications one of the most effective scanners utilized is a relatively simple rotating mirror. Operating in an evacuated enclosure, mirrors with rotational speeds greater than 100,000 RPM are commercially available.

Since the advent of lasers, considerable effort has been spent on the development of electronic beam-steering techniques for optical systems. The normal microwave phrased-array system of individual phase shifters at each discrete element of a radiating array is not practical in the optical region, simply because of dimensional considerations. It is virtually impossible to construct such a phased array with $\lambda/2$ spacing between elements when $\lambda$ is about $10^{-4}$ centimeters. If the element spacing becomes appreciably wider than $\lambda/2$ without a corresponding increase in the size of the individual element apertures, more and more of the power is radiated in grating lobes rather than in a single main beam. If the element apertures increase in proportion to the element spacing the allowable scan angle decreases because of the sharpness of the element pattern.

Because direct electrical deflection of a light beam over wide angles is relatively difficult to obtain, the technique which has been developed combines a laser with a cathode ray tube and achieves light-beam deflection indirectly in response to electron beam deflection as described in U.S. Pat. No. 3,992,681. This device differs from other methods of light deflection in that the light is not actually scanned. Rather, laser light is generated so that it emerges from the resonator with the desired direction of propagation. This is accomplished by selectively directing the laser pump radiation through the active medium.

In order for the scan laser to work, a laser medium (solid, liquid or gas) capable of high-gain operation in a high-numerical aperture is required. With a laser that provides a single-path gain of 1.15 in an aperture greater than f/20 and with the state-of-the-art optical engineering plus a reasonable economical electron-beam system, about $10^5$ spots per field can be realized.

The scan laser approach allows an optical radar to transmit a signal at a varying angle. In a homodyne or heterodyne receiver the local oscillator must be coordinated with the scan laser in the transmitter such that the output of the local oscillator impinges upon a detector at the same time and the same position that the signal reflected from the target returns to the receiver. If the reflected signal from the target takes, for example, 50 milliseconds to return, it is only necessary for the local oscillator to impinge upon the detector at the expected time of return and at the expected angle of return.

Depending upon the range uncertainty of the target, it will be necessary for the local oscillator to remain focused upon the detector for a longer duration than the expected time of return. The rate of scan for the transmitter will depend upon the amount of time that the local oscillator must remain focused for a given return signal.

In view of the above problems it is necessary to have a system that has the capability to rapidly acquire, recognize, track and perform simultaneous guidance functions for a multiplicity of weapons against a multiplicity of targets. It is necessary to develop a receiver that will allow the transmitter to scan a greater number of beam positions per second while maintaining a sufficient range uncertainty in the receiver.

SUMMARY OF THE INVENTION

The present invention disclosed and claimed herein provides an optical radar system for transmitting a first coherent signal and receiving the reflected portion thereof. The transmitter has a means for generating the first coherent signal at an angle that is varied by a first steering means. The first coherent signal is then collimated through a collimating means, processed through a modulating means and then transmitted.

The receiver has means for generating a second coherent signal that is divided into a plurality of local oscillator beams. The angle of each of the local oscillator beams is varied by a second steering means for input to a mixing means. The mixing means sums together one of the local oscillator beams with a corresponding return signal, the corresponding return signal being comprised of the reflected portion of the transmitted first coherent signal. The output of the mixing means is input to a first detecting means.

The frequency of the first coherent signal and the second coherent signal are sampled by a first and second sampling means, respectively. A summation means sums the outputs of the first and second sampling means for input to a second detecting means. The second detecting means detects the frequency difference between the first and second coherent signal and generates a control signal to adjust the frequency of the first coherent signal. For heterodyne operation a selected frequency difference is generated whereas for homodyne operation a zero frequency difference is generated. A synchronization means coordinates the first and second steering means such that each of the local oscillator beams will overlap with each of the corresponding return signals at the detecting means. A processing means processes the output of the first and second detecting means to provide information about the return signal.

BRIEF DESCRIPTION OF THE DRAWINGS

For a more complete understanding of the present invention and the advantages thereof, reference is now made to the following description taken in conjunction with the accompanying drawings.

Referring to the drawings.

DETAILED DESCRIPTION OF THE INVENTION

Figure 1:
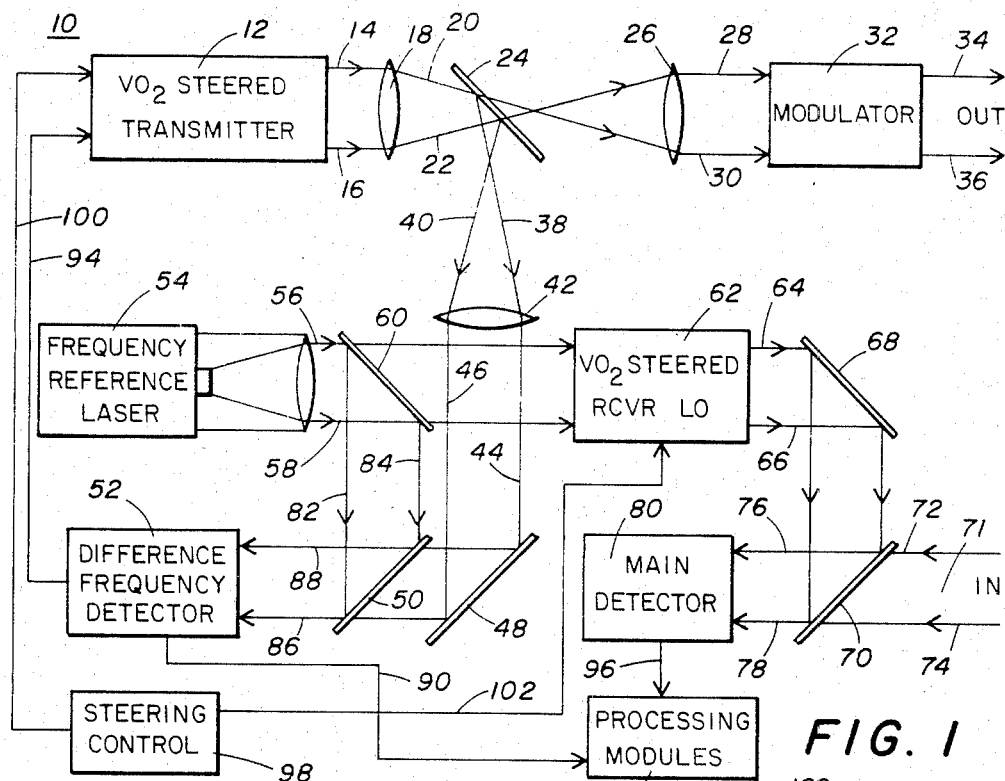
FIG. 1 is a schematic diagram of the scanning laser radar of the present invention.

Referring now to FIG. 1 there is shown a schematic diagram of the optical laser radar 10 of the present invention. A vanadium oxide steered transmitter 12 generates a coherent light beam that is defined by the light rays 14 and 16. Light rays 14 and 16 pass through a convex lens 18 that condenses the light rays along a path defined by light rays 20 and 22. Light rays 20 and 22 pass through a partially reflecting mirror 24 to a convex lens 26 wherein a portion of the light rays 20 and 22 is reflected.

The convex lenses 18 and 26 are spaced such that their focal points overlap to produce a collimated output from the convex lens 26 as defined by light rays 28 and 30. This arrangement of lenses allows the output of the transmitter 12 to be collimated into a much narrower beam width. The light beam defined by light rays 28 and 30 is passed through an electro-optic modulator 32 that increases or decreases the loss in the optical path to provide amplitude modulation (AM). The output beam from the modulator 32 is defined by light rays 34 and 36.

The coherent output beam for most lasers is generally collimated to the order of a milliradiam or narrower by the laser process in the natural operation of the device. In many radar applications, however, even narrower transmission beams are desirable. As with all optical systems, the brightness (or radiance) of a laser beam in watts per square meter per steradian can never be increased by a subsequent pass of optics. Brightness can, however, be preserved through ideal lens systems as beam divergence and area are transformed.

Although not shown the light beam defined by light rays 34 and 36 is then passed to suitable transmission optics that, with suitable background-rejection filters, are required to convert the laser and its companion optical receiver, as described below, into a useful radar. These optical "antennas" are generally adaptations of classical telescope configurations, and their chief functions are analogous to those of microwave antennas, namely, to realize the desired beam concentration of transmitter energy or to gather as much energy as possible into the receiver while controlling its field of view (FOV). Depending upon the transmission optics utilized, the beam width of a given signal from transmitter 12 is increased or decreased to cover a larger or smaller FOV, respectively.

The partially reflecting mirror 24 is positioned in the optical path between the convex lenses 18 and 26 and is operable to reflect approximately 1% of the signal to provide a sampled signal defined by light rays 20 and 22. The reflected signal from the mirror 24 is defined by light rays 38 and 40. Light rays 38 and 40 are then passed through a convex lens 42 and collimated into an optical path defined by light rays 44 and 46. The optical path from the convex lens 18 to the convex lens 42 is equal to the sum of the focal lengths of the convex lenses 18 and 42. The combination of convex lenses 18 and 42 operates in a similar manner to the combination of convex lenses 18 and 26 in that the light signal defined by light rays 46 and 44 is collimated.

The collimated light signal defined by light rays 44 and 46 is reflected off of a reflecting mirror 48, and passes through a beamsplitter 50 to a difference frequency detector 52. The beamsplitter 50 will transmit eight percent of the incident light on the surface thereof and reflect the remaining twenty percent.

A frequency reference laser 54 comprised of a single-mode RF-excited $CO_2$ laser, outputs a coherent signal defined by light rays 56 and 58. Light rays 56 and 58 are passed through a partially reflecting mirror 60 to a vanadium oxide steered local oscillator 62. The operation of the vanadium oxide steered local oscillator 62 will be described in detail below.

The vanadium dioxide ($VO_2$) steered local oscillator 62 outputs a local oscillator beam that is defined by light rays 64 and 66 that are reflected by a reflecting mirror 68 and are directed toward a summation mirror 70. Although not shown, the telescope described above receives the portion of the transmitted signal that is reflected from a distant target and inputs it to the summation mirror 70 as a return signal 71 as defined by light rays 72 and 74.

The summation mirror 70 acts as a mixer to sum the return signal with the output of the local oscillator 62 thus providing a photomixed signal that is defined by light rays 76 and 78. The photomixed signal defined by light rays 76 and 78 is input to a detector 80. Photomixing offers a means of realizing coherent optical detection. Because lasers emit narrow spectral lines, it is possible to obtain mixing action at optical frequencies between two laser signals and build optical heterodyne or homodyne receivers. Photomixing of the weak return signal 71 with a strong local oscillator signal defined by the light rays 64 and 66 serves to eliminate the internal noise of the detector 80 from consideration in the output signal-to-noise ratio.

The partially reflecting mirror 60 reflects 1% of the light signal defined by light rays 56 and 58 to provide a sampled signal defined by light rays 82 and 84. The sample signal defined by light rays 82 and 84 is input to the beamsplitter 50 and twenty percent of the sampled signal is reflected therefrom. A summation signal defined by light rays 86 and 88 is comprised of the sampled transmitter signal as defined by light rays 46 and 44 and the sampled frequency reference laser signal as defined by light rays 82 and 84. The difference frequency detector 52 will output a control signal on line 90 that is input to a processing module 92. The difference frequency detector 52 will control the frequency difference between the transmitter 12 and the frequency reference laser 54. The difference frequency detector 52 will control the transmitter 12 along the control line 94 to maintain the required frequency difference. For heterodyne operation a specific frequency difference must be maintained whereas for homodyne operation a zero frequency difference must be maintained.

The processing module 92 receives inputs from the difference frequency detector 52 along line 90 and from the detector 80 along line 96. The processing module determines the type of operation, heterodyne or homodyne, and will process the information received from the return signal.

A steering control 98 controls the position of both the transmitter signal that is defined by light rays 34 and 36 and the local oscillator beam as defined by light rays 64 and 66. A control line 100 connects the steering control 98 to the transmitter 12 and a control line 102 connects the steering control 98 to the local oscillator 62. The steering control 98 is capable of independently positioning the output light beams of the local oscillator 62, as defined by light rays 64 and 66, to compensate for the delay between transmission of a signal and the return of the reflected portion of that transmitted signal.

The transmitter 12 is capable of outputting a coherent signal in varying directions. Each direction is defined as a beam position for the transmitter. As the transmitter is stepped to an adjacent beam position the minimum angular rotation of the beam is limited only by the resolution of the transmitting optic systems for the telescope. The transmitter of the present invention has approximately $10^5$ beam positions and can be scanned at a rate of $10^6$ beam positions per second.

For each given beam position that is transmitted from the radar 10 the output of the local oscillator 62 must be steered to a position that corresponds to the return signal from that given transmitted signal. This positions the signal from the local oscillator 62, as defined by light rays 64 and 66, to align with the return signal as defined by light rays 72 and 74. The summation signal, as defined by light rays 76 and 78, then provides optimum detection at detector 80.

Although only one local oscillator beam, as defined by light rays 64 and 66, is shown, it should be understood that the $VO_2$ steered local oscillator 62 is capable of generating a plurality of local oscillator beams having different directions. The operation of the multiple local oscillator beams is more fully described below.

Figure 2:
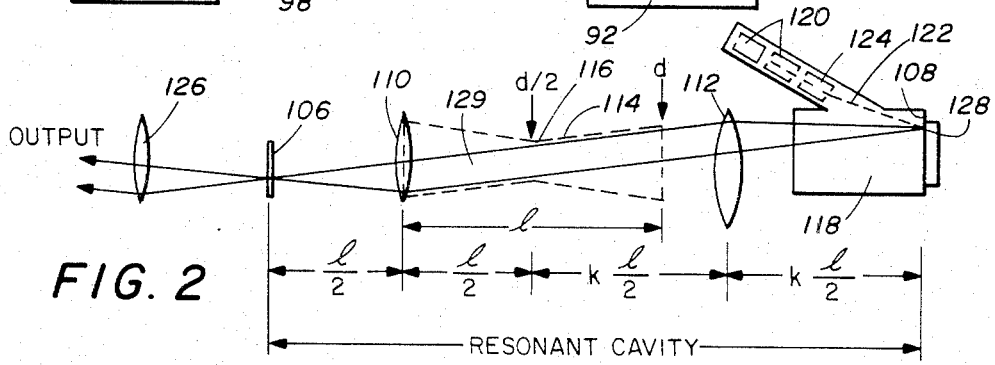
FIG. 2 is a schematic representation of the scanning laser.

Now referring to FIG. 2 there is shown a scan laser 104 that is utilized in the transmitter 12 of FIG. 1. The resonant cavity for the scan laser 104 is the distance between an output reflector 106 and a control reflector 108. A convex lens 110 is placed within the resonant cavity a distance of one focal length of the convex lens 110 from the output reflector 106. A second convex lens 112 is placed within the resonant cavity a distance of one focal length of the second convex lens 112 from the control reflector 108. The distance between the first and second convex lenses 110 and 112 is equal to the sum of their respective focal lengths. A laser medium 114 having a length equal to twice the focal length of the convex lens 110 is disposed between the first and second convex lenses, 110 and 112, and adjacent to the first convex lens 110. The laser medium 114 is configured to have a circular cross section with decreasing diameter from both ends thereof to a position central thereof forming a constricted neck portion 116. The neck portion 116 has a diameter that is one-half the diameter of the end portion thereof.

An off-axis cathode ray tube 118 (CRT) surrounds the control reflector 108. An electron gun 120 generates an electron beam 122 that is deflected by a deflecting coil 124. The electron beam 122 impinges upon the surface of the control reflector 108 in a selected small area defined by the deflection of the deflection coil 124. The design of the CRT 118 will determine the size of the area that is covered by the electron beam 122.

A collimating lens 126 is placed outside the resonant cavity a distance of one focal length of the collimating lens 126 from the output reflector 126. The collimating lens 126 receives the output from the output reflector 106 and collimates the light rays.

The control reflector 108 is fabricated with a thin film of vanadium dioxide ($VO_2$). The change in optical properties of $VO_2$ as a function of temperature forms the mechanism of operation of the scan laser 104. Below 67° C. $VO_2$ is a dielectric and is transmissive to a wide band of wavelengths in the infrared including the 10.6 micrometer region. $VO_2$, however, undergoes a phase change to a metallic state and becomes a good reflector, approximately 85% for 10.6 micrometer radiation above 67° C. If the temperature of the film is initially well below the transition value and it is heated, the film reflectance abruptly increases at temperatures above the critical value. On cooling, the reflectance relaxes and the $VO_2$ film returns to the transmissive state. In the reflective state the multilayer stack comprising a $VO_2$ film has a reflectance in the 10.6 micrometer range in excess of 96% whereas the reflectance in the transmissive state is below 20%. The operation of $VO_2$ and thermo-chromic materials in general is more fully described in the pending application of James D. Billingsley and Fergus E. Moore entitled "PREDETECTION PROCESSING OF OPTICAL INFORMATION" Ser. No. 279,171, filed June 30, 1981, now abandoned in view of the pending application Ser. No. 528,222, Aug. 31, 1983, of James D. Billingsley and Dayton D. Eden entitled "DARK FIELD INFRARED TELESCOPE", Ser. No. 279,151, filed June 30, 1981, now U.S. Pat. No. 4,421,985, issued Dec. 20, 1983.

The CRT 118 and the control reflector 108 are configured such that the electron beam 122 is incident on the variable reflectance surface of the control reflector 108. The electron beam creates a localized heating on the surface of the control reflector 108 thereby increasing the reflectance of a small area with a diameter of approximately 350 micrometers. This small spot of reflectance is referred to as a "pixel" 128 which is used in the art to refer to a picture element.

The active laser medium 114 is an axially flowing DC-excited mixture of $CO_2$, $N_2$ and He gases at a total pressure of about 10 torr which lases at 10.5 micrometers. When there is no reflective pixel painted on the control reflector 108, the laser medium 114 has a round-trip small signal gain of approximately 2.2 due to the population inversion of the ions resulting from an external pump which is not shown. When a signal at the proper frequency travels through the laser medium 114 the ions are reduced to the ground state producing coherent light.

When the electron beam 122 impinges upon the control reflector the pixel 128 is formed creating a high reflectance spot at the control reflector 108. The combination of the output reflector 106 and the pixel 128 creates an optical feedback path to sustain an oscillation in the resonant cavity of the scan laser 104. The coherent light that is output from the laser medium 114 to the second convex lens 112 is focused on the pixel 128. The pixel 128 is configured to reflect the focused light with minimum diffraction and transmit it back through the convex lens 112. The convex lens 112 converts the diffracted pattern from the pixel 128 to a collimated beam 129 that passes through the active laser medium 114. The active laser medium 114 provides gain for the collimated beam 129. The collimated beam 129 passes through the active laser medium 114 and is condensed by the first convex lens 110 onto the output reflector 106 thus completing the optical feedback path. As the collimated beam 129 passes through the active laser medium 114 the gain of the active laser medium 114 along the optical path is reduced. The threshold condition for establishing laser oscillations in any optical resonater is reached when the gain of the optical traveling wave passing through the active laser medium 114 just balances the loss associated with the resonator. With the output reflector 106 having a reflectivity of approximately 70% and the pixel 128 having a reflectivity of approximately 96%, the overall roundtrip associated gain of the oscillator must be approximately 1.5 to sustain oscillations within the resonant cavity.

The necked-down shape of the active laser medium 114, as described above, maximizes mode-filling efficiency and, by defining the mode diameter, provides uniform power output for all beam directions. As shown in FIG. 2, the collimated light beam 129 traverses a cylindrical path through the active laser medium 114. This allows the optical path traversed by the coherent light beam 129 to occupy an equal portion of the active laser medium 114 regardless of the position of the pixel 128. In a cylindrical laser medium, on the other hand, a coherent light beam entering along the central axis of the cavity would occupy the full diameter of the laser medium whereas a coherent light beam entering at an angle to the central axis would occupy a lesser amount of the active medium with the result that a lower output power/light beam would be output by a cylindrical laser medium for angles off the central axis.

The pixel 128 that is created on the surface of the control reflector 108 by the electron beam 122 absorbs a small percentage of the power in the resonant cavity of the scan laser 104. This absorbed power causes some localized heating, thus increasing the temperature at the pixel 128. Optimization of power and intensity with existing $VO_2$ technology is achieved by increasing the size of the pixel 128 at the control reflector 108. This is done by utilizing a lens of longer focal length (K>1) for the second convex lens 112 to decrease the power density and temperature rise at the control reflector 108.

The number of beam positions, or directional modes, is proportional to the square of the cross-sectional area-to-length ratio of the active laser medium 114. For example, to achieve 100,000 beam positions in a $CO_2$ scan laser, the "gain medium" must be 2.5 or 3 centimeters in diameter at the neck portion 116 and 30 or 40 centimeters in length. Output power for a wall stabilized $CO_2$ laser decreases rapidly with increasing laser diameter and increases with increasing length.

Figure 3:
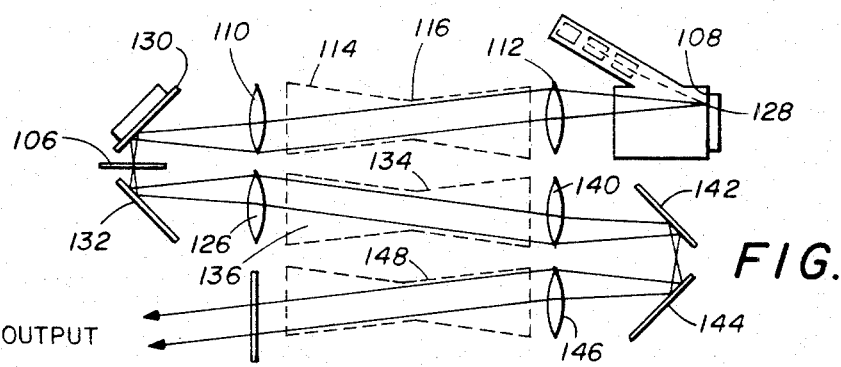
FIG. 3 is a schematic diagram of the scanning laser with an associated laser amplified in a folded configuration.

Now referring to FIG. 3 there is shown a schematic diagram of the transmitter 12 of FIG. 1. A laser oscillator, similar to that described above with reference to FIG. 2, is shown as bounded by the output reflector 106 and the control reflector 108. The basic difference between the scanning oscillator 104 of FIG. 2 and the resonant cavity in the oscillator of FIG. 3 is a piezo frequency control 130 that is inserted within the optical path between the convex lens 112 and the output reflector 106. Also the output reflector 106 is now oriented at a right angle with respect to the convex lens 110 and the piezo frequency control 130 is oriented at a 45° angle with respect to the convex lens 110. The piezo frequency control 130 is comprised of a piezoelectric material that changes the optical length of the resonant cavity as bounded by the output reflector 106 and the control reflector 108. This provides a method for controlling the resonant frequency of the transmitter 12 of FIG. 1.

A reflecting mirror 132 is positioned within the optical path of the light beam that is output from the output reflector 106 between the collimating lens 126 and the output reflector 106 and oriented at a 45° angle therewith. The collimated light that is output by the convex lens 126 forms a light beam 136 that is input to an active laser medium 134 that amplifies the light beam 136. The amplified light beam 136 is then passed through a convex lens 140 that condenses the amplified light beam 136.

A reflecting mirror 142 is positioned in the optical path of the light beam 136 between the convex lens 140 and the focal point of the convex lens 140 and oriented at a 45° angle therewith. A reflecting mirror 144 is positioned within the optical path of the amplified light beam 136 reflected from the reflecting mirror 142 and oriented at a 90° angle therewith. A convex lens 146 receives the light reflected off of the reflecting mirror 144 and collimates the amplified light beam 136. The focal point of the convex lens 146 is positioned to overlap the focal point of the convex lens 140 along the same optical path. An active laser medium 148 is placed within the optical path of the amplified light beam 136 that is output by the convex lens 146 to provide further amplification.

The active laser mediums 134 and 148 both have the necked down configuration of the active laser medium 114 as described above with reference to FIG. 2. This allows the light beam 136 to occupy a uniform cylindrical volume through each of the active laser mediums 134 and 148 in all positions of the light beam 136 that are output by the output reflector 106. The lens and mirror arrangement described above allows the light beam 136 to be amplified and output from the active laser medium 148 without diminishing the angular resolution of the light beam 136 that is output from the output reflector 106. It also allows the transmitter to occupy a smaller area due to a folded configuration without reducing the optical length needed for amplification.

Figure 4:
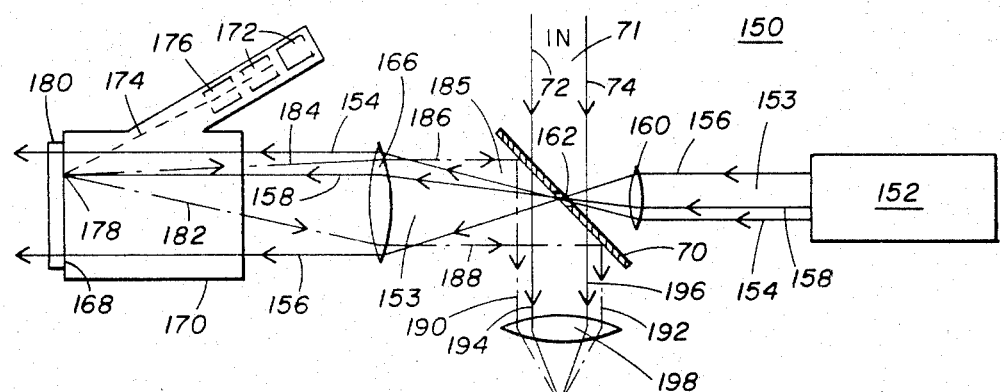
FIG. 4 is the preferred embodiment of the agile receiver.

Now referring to FIG. 4 there is shown a schematic diagram of the preferred embodiment of an optical receiver 150 of the present invention. A frequency reference laser 152 is comprised of a stable single-mode oscillator that is designed for maximum short-term frequency stability. An intracavity polarized diffraction grating ensures that the frequency reference laser 152 always operates on the same $CO_2$ rotational line. The laser 152 has an output power level of 20 watts.

A coherent light beam 153 output from the laser 152 is defined by three light rays 154, 156 and 158. A convex lens 160 condenses the coherent light beam 153 and passes it through an orifice 162 in a beamsplitter 70. The orifice 162 is displaced from the convex lens 160 a distance equal to the focal length of the convex lens 160.

The light beam 153, after passing through the orifice 162, is then received and collimated by a convex lens 166. The convex lens 166 is spaced from the orifice 162 a distance equal to the focal length of the convex lens 166.

The collimated coherent light beam 153 that is output by the convex lens 166 is incident to and uniformly illuminates the surface of a control reflector 168. The surface of the control reflector 168 is spaced from the convex lens 166 a distance equal to the focal length of the convex lens 166. The control reflector is fabricated of a thin film of $VO_2$ as described above with reference to the control reflector 108 of FIG. 2.

The control reflector 168 is surrounded by an off-axis cathode ray tube 170. An electron gun 172 emits an electron beam 174 which is positioned by a deflecting coil 176. The electron beam 174 impinges upon the surface of the control reflector 168 and generates a localized heating to increase the reflectance in a selected small area to form a pixel 178. The pixel 178 is formed in a similar manner to the pixel 128 of FIG. 2 as described above.

The light ray 158 is incident upon the surface of the pixel 178. At a wavelength of 10.6 micrometers the pixel 178, having a diameter of approximately 200 micrometers, will diffract the light beam into a conical path. The maximum size of the pixel 178 is limited by the level of diffraction that is required to return the light ray 158 in a conical pattern. This dimension is also effected by the focal length of the convex lens 166.

The diffracted light ray 158 that is returned from the pixel 178 to the convex lens 166 is defined by the light rays 182 and 184. The convex lens 166 is operable to collimate the light rays 182 and 184 into a local oscillator beam 185 as defined by the light rays 186 and 188. The local oscillator beam 185 impinges upon the lower surface of the beamsplitter 70. The beamsplitter 70 is transmissive to eighty percent of the local oscillator beam 185 and reflective to the other twenty percent thereof. The reflected portion of the local oscillator beam 185 is defined by the light rays 190 and 192. The return signal 71, as defined by the light rays 72 and 74, impinges upon the upper surface of the beamsplitter 70. The beamsplitter 70 will transmit eighty percent of the return signal 71 and reflect the other twenty percent thereof.

A convex lens 198 condenses the local oscillator beam 185, that is defined by light rays 190 and 192, and the return signal 71, that is defined by the light rays 194 and 196, onto a detector 200. The detector 200 is spaced from the convex lens 198 a distance equal to the focal length of the convex lens 198.

The electron beam 174 is deflected by the deflection coil 176 to position the pixel 178 on the control surface 168 in such a manner that the local oscillator beam 185, as defined by the light rays 190 and 192, impinges upon the surface of the detector 200 in such a manner that the local oscillator beam 185 will overlap the return signal 71. This overlapping is the photomixing operation of the optical receiver 150. If the frequency of the return signal 71 and the frequency of the frequency reference laser 152 are separated by a specific frequency then the photomixing operation will produce a signal at an intermediate frequency equal to the frequency difference.

Although only one pixel 78 is shown in FIG. 4 it should be understood that the electron beam 174 can impinge upon the control surface 168 at more than one point, thus painting a plurality of pixels. This can be done simultaneously due to the finite relaxation time of the pixels so as to generate a plurality of local oscillator beams 185 at a multitude of positions. Since the coherent light from the frequency reference laser 152 uniformly illuminates the control surface 168 the only limitation to the number of local oscillator beams 185 is the speed at which the electron beam can paint pixels upon the control surface 168. Each pixel is capable of forming a local oscillator beam having a power of 0.2 milliwatts which is all that is required for photomixing in an optical radar. This allows a very stable frequency reference laser 152 to be utilized without incorporating a steering system capable of multidirection beams within the laser 152. The steering capability of the present invention is external to the laser 152.

Figure 5:
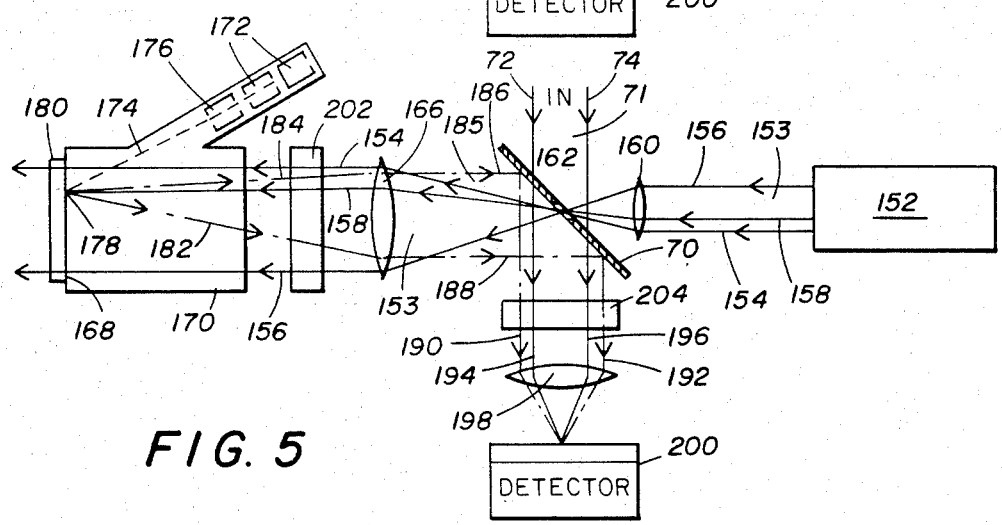
FIG. 5 is an alternate embodiment of the agile receive.

After the local oscillator beam 185 is collimated by the convex lens 166 the incident light that impinges the surface of the control surface 168 at points other than the area of the pixel 178 is transmitted through the control reflector 168. The properties of the $VO_2$ film that covers the control reflector 168 allow only a transmissivity of approximately 78-80%. The remaining 20-22% results in a spectral reflection of the local oscillator beam 185. As can be seen in FIG. 5 the spectral reflection returns along a path normal to the convex lens 166. The convex lens 166 will condense any spectral reflections and pass them through the orifice 162 thus preventing the spectral reflections from impinging upon the detector 200. If the spectral reflections are allowed to impinge upon the detector 200 it would result in a degradation of the signal-to-noise ratio at the detector 200.

Now referring to FIG. 5 there is shown a second embodiment for the optical receiver 150 of FIG. 4. The frequency reference laser 152 transmits the light beam 153 with a linear polarization. The light beam 153 is processed as described above with the exception that a quarter-wave plate 202 is disposed between the convex lens 166 and the control surface 168. The quarter-wave plate 202 in effect rotates the polarization of the light beam 153 by 45 degrees. Any spectral reflections that are returned along the normal to the convex lens 166 again passes through the quarter-wave plate 202. This results in an additional 45° of rotation or a total of 90° of rotation with respect to the initial light beam 153.

Although the arrangement of the convex lens 166 and the orifice 162 substantially reduces the summation of spectral reflections at the detector 200 there will be some residual spectral reflections that do arrive at the detector 200. To further reduce any residual spectral reflections that are reflected off of the lens 166 and quarter-wave plate 202 an analyzer 204 is disposed between the beamsplitter 70 and the convex lens 198. The analyzer 204 is operable to reflect any light rays that are not cross-polarized with respect to the frequency reference laser 152. As the quarter-wave plate 202 has not cross-polarized the aforementioned spectral reflections, the analyzer 204 will effectively reject any residual spectral reflections that have been reflected off of the lens 106 or quarter-wave plate 202.

The incident light ray 158 is reflected from the pixel 178 in a diffracted pattern that retains its polarization. The analyzer 204 will reject any portion of the local oscillator beam 185 and aforementioned residual reflections that are not cross-polarized and pass only the cross-polarized local oscillator beam 185 and identically polarized return signal 71 to impinge upon the detector 200.

Figure 6:
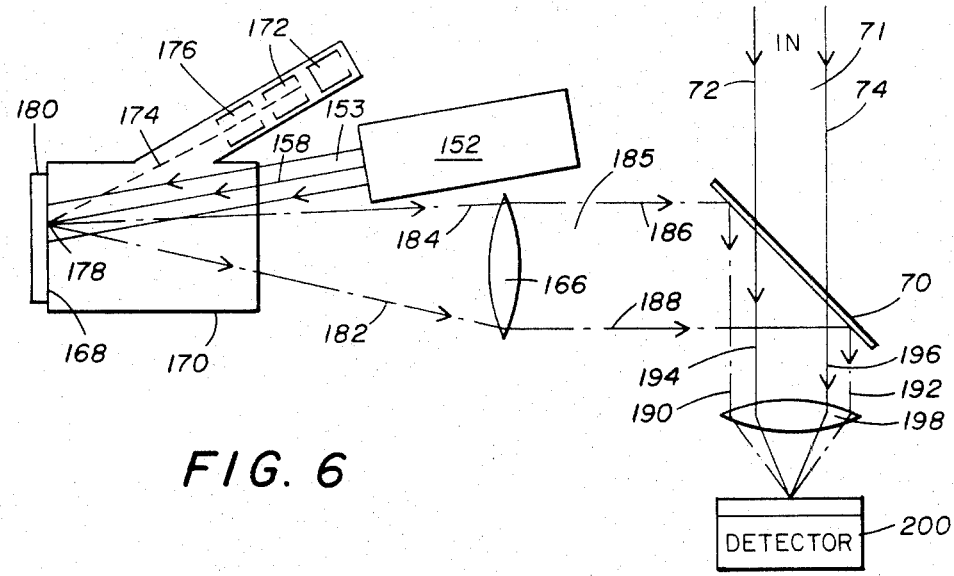
FIG. 6 is an alternate embodiment of the agile receiver.

Now referring to FIG. 6 there is shown a third embodiment of the optical receiver 150 of FIG. 4. The frequency reference laser 152 is oriented at an angle with respect to the control surface 168. The light beam 153, output from the frequency reference laser 152, is incident upon the control surface 168 at an angle such that any spectral reflections resulting from the residual reflectance of the control surface 168 are transmitted at an angle that is equal to the angle of incidence of the light beam 153. The convex lens 166 is positioned such that the spectral reflections will not impinge upon the surface of the convex lens 166.

The pixel 178 will reflect and diffract the light ray 158 incident upon the surface of the pixel 178 in a diffracted pattern. This pattern, as defined by light rays 184 and 182, is collimated by the convex lens 166 resulting in the local oscillator beam 185. The remainder of the receiver operates in a similar manner to that described above with reference to FIG. 4.

In all of the receiver embodiments described above the detector 200 may be segmented to provide separate detection for each of the multiplicity of local oscillator beams to avoid degradation of sensitivity by a local oscillator beam that is not mixing with a received signal. This arrangement also allows resolution of target range-angle ambiguities associated with rapid scanning when range is variable and uncertain.

Figure 7:
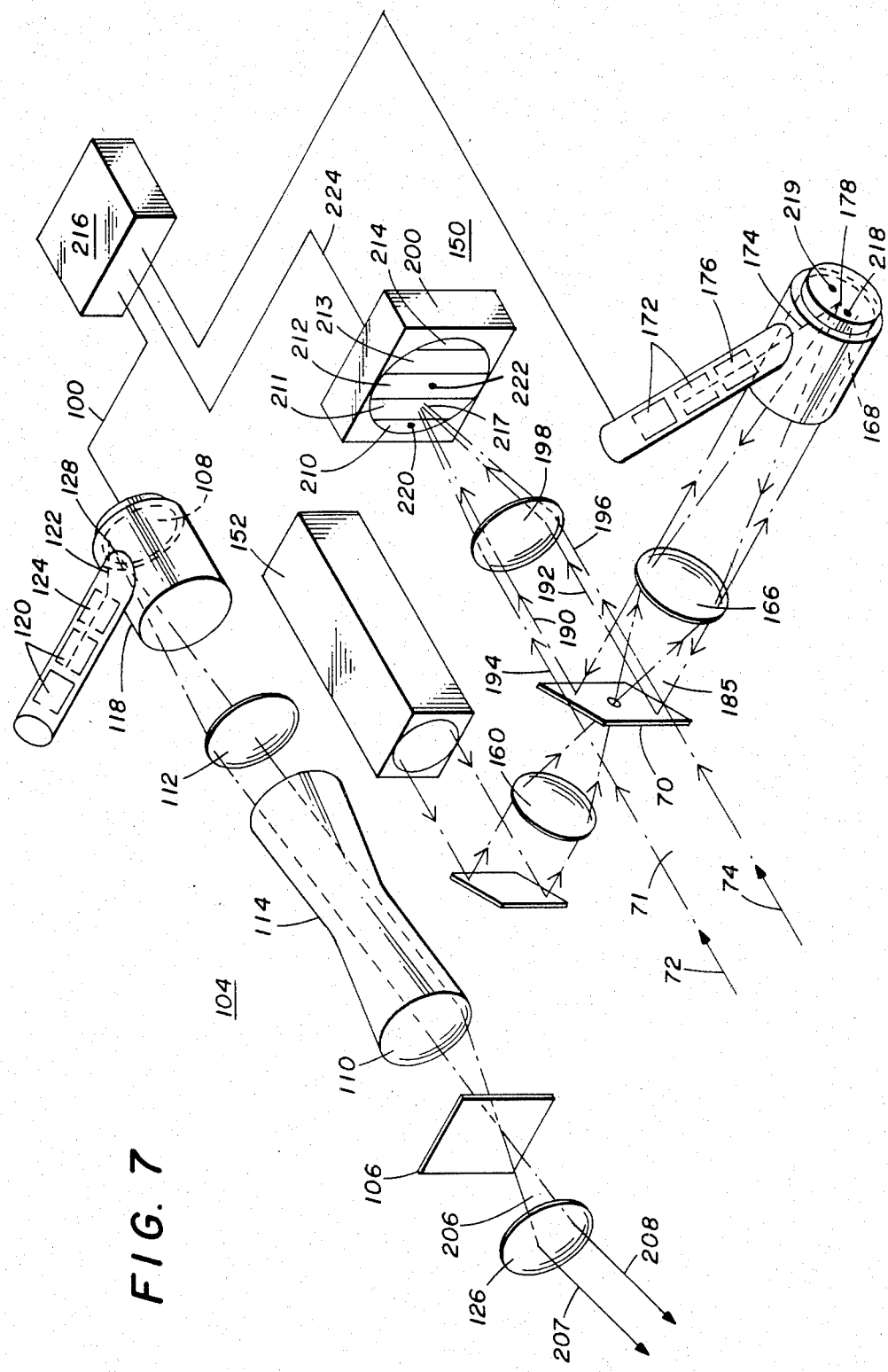
FIG. 7 is an isometric view of the transmitter and receiver of the present invention.

Now referring to FIG. 7 there is shown an isometric view of the optical radar 10 of FIG. 1 that incorporates the optical receiver 150 of FIG. 4. For purposes of clarity, the difference frequency detector 52 of FIG. 1 and the associated mirrors and lenses have been deleted. The transmitter is identical to the scanning laser oscillator 104 of FIG. 2. The deflector plates or coils 124 position the electron beam 122 onto the control reflector 108 generating the pixel 128. As described above, with reference to FIG. 2, the reflectance of the pixel 128 generates an oscillating mode within the resonant cavity to output a coherent light beam 206 from the output reflector 106 which is collimated by the convex lens 126. The light beam 206, as defined by the light rays 207 and 208, has a specific direction or beam position that is determined by the position of the pixel 128 on the control reflector 108. The light beam 206 is then processed by an optical system (not shown) consisting of an optical telescope. The light beam 206 is transmitted to a distant target (not shown) and the reflected portion of the light beam 206 is returned along the same telescope that transmitted the light beam 206 as the return signal 71. The return signal 71 is defined by the light rays 72 and 74. Eighty percent of the return signal 71 is transmitted through the beamsplitter 70 and condensed by the convex lens 198 onto the detector 200.

The surface of the detector 200 has an array of five photovoltaic mercury cadmium telluride detectors 210, 211, 212, 213 and 214 (hereinafter photovoltaic detectors). Each of the photovoltaic detectors 210, 211, 212, 213 and 214 is capable of independently detecting the return signal 71 that is mixed with the local oscillator beam 185.

The transmitted light beam 206 is transmitted to a distant target, for example, that is 6 kilometers away. The return signal 71, that is reflected from the distant target, will return along a direction determined by the original direction of the transmitted light beam 206 approximately 40 microseconds later in time. A control box 216, that combines the functions of the steering control 98 and the processing modules 92 of FIG. 1, steers the local oscillator beam 185, defined by the light rays 190 and 192, until the local oscillator beam 185 is parallel with the portion of the return signal 71 transmitted through the beamsplitter 70, as defined by the light rays 194 and 196. The convex lens 198 will condense the parallel rays 190, 192, 194 and 196 onto a common spot 217 on the photovoltaic detector 211.

For a given target there will be a range of uncertainty such that an operator knows the approximate time it takes for a return signal to arrive at the receiver input. The level of uncertainty in the target position is called the range uncertainty. By knowing the range uncertainty an operator can anticipate when and where to position the local oscillator beam 185 on the detector 200. For example, a target that is 6 kilometers away will take approximately 40 microseconds to return the reflected portion of the light beam 206 to the receiver 150 as the return signal 71. It is not necessary to position the local oscillator beam 185 onto the detector 200 until 40 microseconds plus or minus the range uncertainty has elapsed. If the range uncertainty is plus or minus 0.5 kilometers, the local oscillator beam 185 is positioned on the detector 200 at a position that corresponds to the direction that the transmitted beam has been transmitted at 36.7 microseconds after the light beam 206 has been transmitted and for a duration of 6.7 microseconds. This ensures reception of the return signal 71. It should be understood that the function of the operator in the above example is performed automatically by the control box 216.

The control box 216 controls the deflection coils 176 through the control line 102 to position the electron beam 174 onto the control reflector 168 to generate the high reflectance pixel 178 as described above with reference to FIG. 5. By varying the position of the pixel 178 on the control reflector 168 the local oscillator beam 185 can be positioned at any spot on the surface of the detector 200 to overlap with the return signal 71.

Although only one return signal 71 and one local oscillator beam 185 have been shown for purposes of clarity, it should be understood that the electron beam 174 is capable of generating a plurality of pixels on the control surface 168. For illustrative purposes, two of these pixels are represented by 218 and 219 on the control reflector 168. The pixel 218 will be condensed by the convex lens 198 to intersect with the photovoltaic detector 211 at the spot 220. In a similar manner the pixel 219 intersects the photovoltaic detector 212 at the point 222. Although the scan laser only transmits one light beam 206 at a time the transmitter can be horizontally scanned to vary the position in time of the light beam 206 such that, upon reception, the return signal 71 will have a position that will intersect one of the points 217, 220 or 222 on the photovoltaic detectors 210, 211 and 212, respectively, depending upon the time that the signal is received and the position of the transmitted light beam 202. Depending upon the type of target that is irradiated with the transmitter light beam 206 it will be necessary for the local oscillator beams, of which only local oscillator beam 185 is shown, to remain fixed on the points 217, 220 and 222 until the corresponding return signals have been received. As each of the photovoltaic detectors 210, 211 and 212 operate independently, the local oscillator beams remain fixed on the points 217, 220 and 222 until the return signals have been received and condensed by the convex lens 198. Upon reception of the return signals the outputs from the photovoltaic detectors 210, 211 and 212 can be processed by the control box 216 which is connected to the detector 200 by a control line 224.

The return signals can be received simultaneously or they can arrive at different times depending upon the range of the target from the transmitter. By allowing a plurality of local oscillator beams to be generated it is possible to scan the transmitter at a high rate for a given range uncertainty. In the prior art systems it was necessary to scan from one beam position to the next at a rate that was determined by the range of uncertainty. The local oscillator was required to illuminate the detector for a duration of time that would insure reception of the return signal. If a return signal at a different position was received during this duration the information would be lost so the transmitter was required to delay the next beam position by a duration equal to the range uncertainty.

With the system of the present invention the number of beam positions that can be transmitted during a given range uncertainty is limited only by the number of detector elements comprising the detector 200. For example, as compared to the prior art system a detector having an array of five photoconductive detectors can transmit five beam positions in the same time as the prior art system transmitted one beam position.

Figure 8:
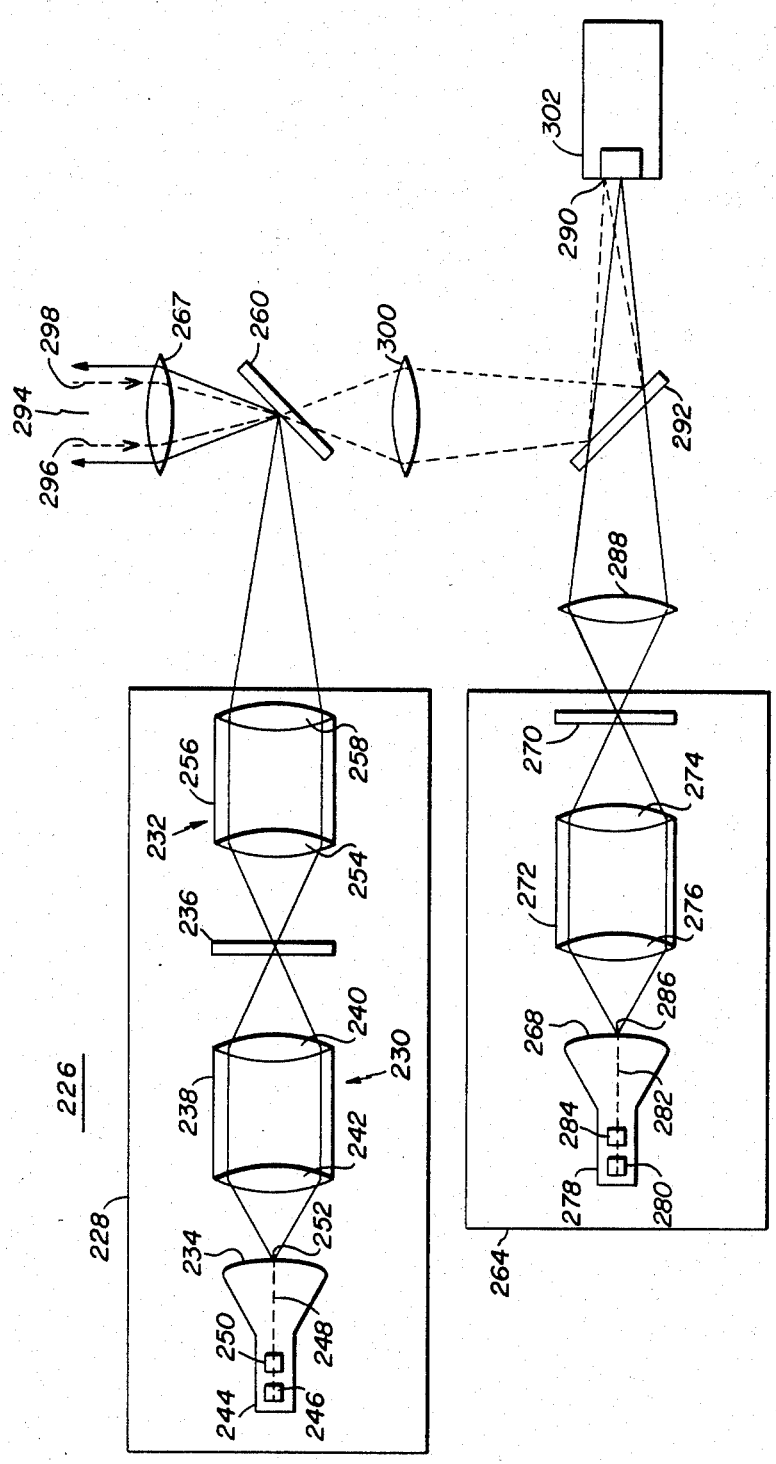
FIG. 8 is a schematic diagram of a second embodiment of the scanning laser radar of the present invention.

Now referring to FIG. 8, there is shown a laser radar 226 as a second embodiment of the present invention. The radar 226 utilizes a scanning laser transmitter 228 that is comprised of a scanning laser oscillator 230 and a laser amplifier 232. The scanning laser amplifier 230 has a resonant cavity defined by a control reflector 234 and an output reflector 236. An active laser medium 238 is disposed between the control reflector 234 and the output reflector 236. The active laser medium 238 has a cylindrical shape and is oriented with its longitudinal axis parallel to the resonant cavity of the oscillator 230.

A convex lens 240 is disposed at one end of the active laser medium 238 and displaced one focal length from the control reflector 236. A convex lens 242 is disposed at the other end of the active laser medium 238 and displaced one focal length from the control reflector 234. The active laser medium 238 has a longitudinal dimension that is equal to the sum of twice the focal length of the convex lens 240.

An on-axis cathode ray tube (CRT) 244 surrounds the control reflector 234. The CRT 244 houses an electron gun 246 that generates an electron beam 248. The electron beam 248 impinges upon the surface of the control reflector 234 in a position that is selected by a deflection coil 250.

The surface of the control reflector 230 is fabricated with a multilayer stack of vanadium dioxide as described above with reference to FIG. 2. When the electron beam 248 impinges upon the rear surface of the control reflector 234 the localized heating will increase the reflectance of the control reflector 234 in a small area creating a pixel 252, as described above with reference to FIG. 2. The diffracted beam that is reflected off of the pixel 252 is collimated by the convex lens 242 and passes through the active laser medium 238. The active laser medium 238 provides amplification of the collimated light passing therethrough. The convex lens 240 condenses the light amplified by the active laser medium 238 onto the output reflector 236 thus completing a resonant path for the oscillator 228.

The output beam of the oscillator 228 at the output reflector 236 is collimated by a convex lens 254 and passes through an active laser medium 256 that amplifies the collimated light passing therethrough. A convex lens 258 is disposed at the other end of the active laser medium 256 from the convex lens 254 to condense the output of the active laser medium 256 onto a thermochromic transmit/receive switch 260.

The thermo-chromic transmit/receive switch 260 operates to reflect all of the output power of the convex lens 258 when the thermo-chromic transmit/receive switch 260 is in a reflective state. An external source (not shown) operates to increase or decrease the reflectance of the thermo-chromic transmit receive switch 260. When the transmitter 228 is in the transmitting mode the thermo-chromic transmit/receive switch 260 has a high reflectance to efficiently transmit the output beam to a convex lens 162 that collimates the output beam.

A local oscillator 264 comprises a scanning oscillator similar to the scanning laser oscillator 228 of the transmitter 230. The local oscillator 264 has a resonant cavity defined by a control reflector 268 and an output reflector 270. An active laser medium 272 is disposed within the resonant cavity of the local oscillator 264. A convex lens 274 is disposed at one end of the active laser medium 272 and displaced one focal length from the output control reflector 270. A convex lens 276 is disposed at the other end of the active laser medium 272 and displaced one focal length from the control reflector 268. The length of the active laser medium 272 is equal to twice the focal length of the convex lens 274.

A cathode ray tube 278 surrounds the control reflector 268 and houses an electron gun 280 that generates an electron beam 282. The electron beam 282 is positioned upon the rear surface of the control reflector 268 by a deflecting coil 284 to generate a pixel 286 on the surface thereof. As described above with reference to the scanning oscillator 230, the control reflector 268 and the output reflector 270, when combined with the active laser medium 272, complete an oscillation path for the resonant cavity of the local oscillator 264.

The output of the local oscillator 264 at the control reflector 270 is received by a convex lens 288 and is condensed onto a detector 290. A beamsplitter 292 is displaced between the convex lens 288 and the detector 290. The beamsplitter 292 operates in a similar manner to the beamsplitter 70 of FIG. 4, as described above, to transmit 80% of the output of the local oscillator 264 to the detector 290.

At the time the transmitter 220 is not transmitting, the thermo-chromic transmit/receive switch 260 is transmissive and a return signal 294, as defined by light rays 296 and 298, is received and condensed by the convex lens 262. The condensed return signal 294 will be received by a convex lens 300. The convex lens 300 reflects the return signal off of the beamsplitter 292 and condenses the return signal onto the detector 290. The optical path between the convex lens 300 and the detector 290 is equal to the focal length of the convex lens 300.

When the return signal 294 is condensed upon the detector 290 the local oscillator 264 is steered to produce a local oscillator beam that will overlap with the return signal 294 on the detector 290. The output of the detector 290 will have a difference frequency when the frequency of the local oscillator 264 and the transmitter 228 are different. A heterodyne receiver 302 receives the output of the detector 290 and processes this output to retrieve the information that is contained on the return signal 294.

Although the preferred embodiment of the invention has been described in detail, it should be understood that various changes, substitutions and alterations can be made therein without departing from the spirit and scope of the invention as defined by the appended claims.

What is claimed is:

1. An optical radar comprising:
   a scanning transmitter for generating a collimated first coherent signal having a variable angular position which comprises a scanning laser oscillator having:
      an optically resonant cavity;
      a variable reflectance surface at one end of said resonant cavity;
      an output reflector at the other end of said resonant cavity, said output reflector reflecting a percentage of incident light and transmitting the remaining portion thereof;
      a transmitter electron beam impinging the surface of said variable reflectance surface wherein the reflectivity of a selected portion of said variable reflectance surface increases thereby producing a transmitter pixel having a high reflectance that reflects light in a diffracted pattern;
      an active laser medium between said variable reflectance surface and said output reflector;
      a first focusing lens for collimating the diffracted pattern reflected from said transmitter pixel through said active medium;
      a second focusing lens for condensing the collimated light that passes through and is output by said active medium, said second focusing lens condensing the collimated light on said output reflector wherein an oscillating mode is sustained within said resonant cavity, the direction of which is varied by adjusting the position of said electron beam impinging upon said variable reflectance surface to change the position of said transmitter pixel; and
      a collimating lens for collimating the output of said output reflector, said collimating lens disposed external to said resonant cavity; and a scanning receiver having:
      a scanning local oscillator for generating a second coherent signal having a variable angular position;
      mixing means for mixing the reflected portion of said first coherent signal that is returned as a return signal with second coherent signal; and
      signal detection means for receiving the output of said mixing means and generating a signal in response to the presence of said return signal.

2. An optical radar as described in claim 1 wherein said mixing means comprises a beamsplitter, said return signal impinging upon one surface thereof, said beamsplitter transmitting a portion of said return signal, said second coherent signal impinging upon the opposite side of said beamsplitter from said return signal, said beamsplitter reflecting a portion of said second coherent signal, the transmitted portion of said return signal and the selected portion of said second coherent signal impinging upon a mixer focusing lens, said mixer focusing lens condensing both said return signal and said second coherent signal wherein said return signal will overlap said second coherent signal thereby selectively mixing said return signal to an intermediate frequency.

3. An optical radar as described in claim 1 wherein said signal detection means comprises a photovoltiac mercury cadmium telluride detector for receiving the output of said mixing means wherein said scanning oscillator directs said second coherent signal to overlap said return signal at the surface of said photovoltaic mercury cadmium telluride detector to provide coherent detection of said return signal whereby said scanning oscillator is capable of selectively directing said second coherent signal to a specific area on the surface of said photovoltaic mercury cadmium telluride detector.

\* \* \* \* \*